United States Patent

Magill

[11] Patent Number: 6,049,576
[45] Date of Patent: Apr. 11, 2000

[54] KRONECKER PRODUCT CODE ACQUISITION SYSTEM

[75] Inventor: David T. Magill, Palo Alto, Calif.

[73] Assignee: Stanford Telecommunications, Inc., Sunnyvale, Calif.

[21] Appl. No.: 08/739,318

[22] Filed: Oct. 29, 1996

[51] Int. Cl.[7] .................................................. H04L 7/00
[52] U.S. Cl. ..................... 375/365; 375/200; 375/207; 375/366; 370/320
[58] Field of Search .................................. 375/200, 254, 375/232, 353, 343, 365, 342, 347, 366, 206, 207; 370/320, 347

[56] References Cited

U.S. PATENT DOCUMENTS

| | | | |
|---|---|---|---|
| 4,291,409 | 9/1981 | Weinberg et al. | 375/347 |
| 5,359,627 | 10/1994 | Resnikoff | 375/254 |
| 5,428,647 | 6/1995 | Rasky et al. | 375/366 |
| 5,696,762 | 12/1997 | Nataili et al. | 370/320 |
| 5,745,484 | 4/1998 | Scott | 370/254 |

*Primary Examiner*—Stephen Chin
*Assistant Examiner*—Shuwang Liu
*Attorney, Agent, or Firm*—Jim Zegeer

[57] ABSTRACT

A Kronecker product code structure for a synchronization word is presented which permits the use of dual-mode sequential matched filter. This matched filter permits a large reduction in acquisition time since the number of frequency bins that must be searched is greatly reduced when there is a large frequency uncertainty. In the first mode of operation the output of a filter matched to the high rate code is non-coherently integrated in a post-detection integrator to obtain reliable but ambiguous acquisition of the synchronization word. In the second mode of operation the ambiguity is resolved.

14 Claims, 7 Drawing Sheets

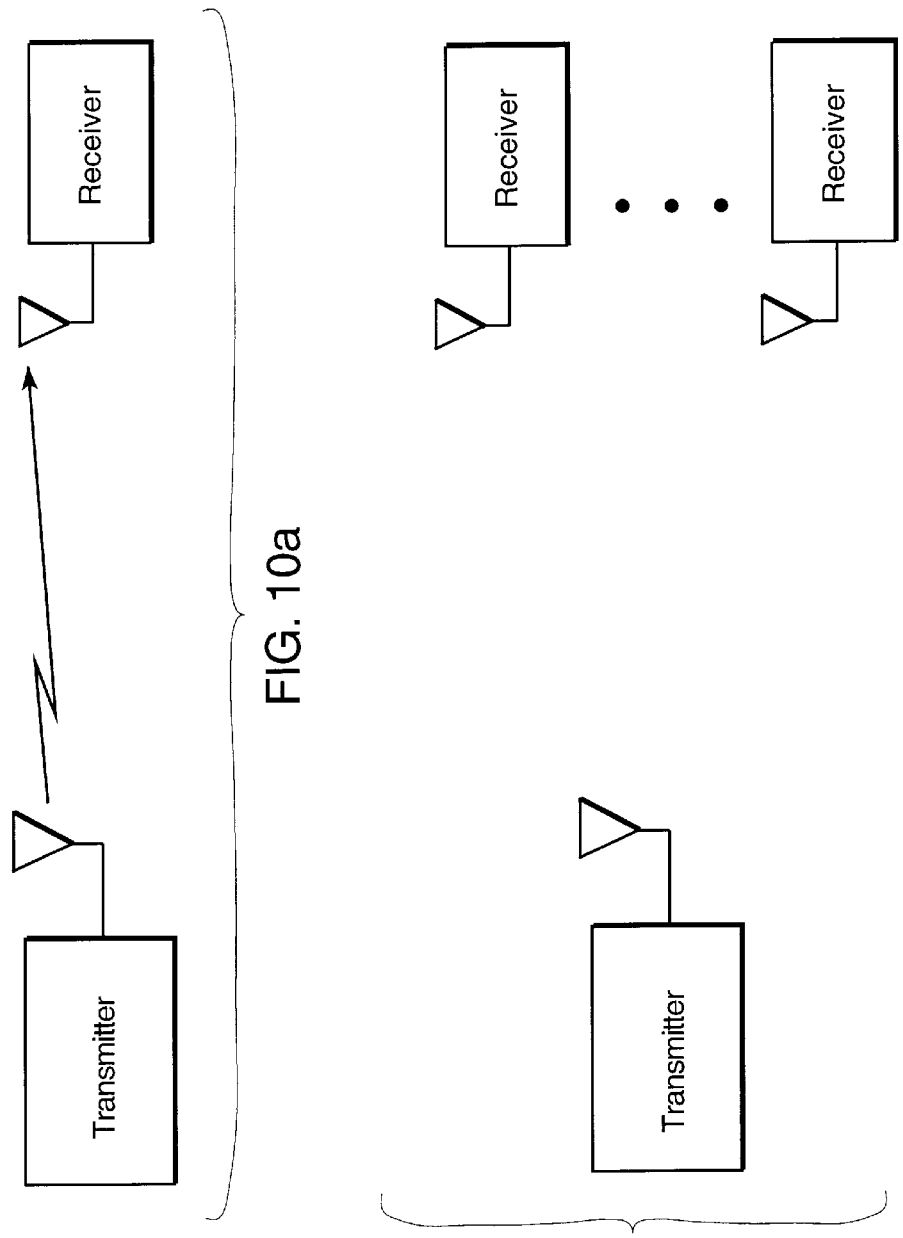

KRONECKER PRODUCT CODE ACQUISITION SYSTEM

FIELD OF THE INVENTION

This application applies to the design of a rapid acquisition synchronization word system for those cases in which there is significant time and frequency uncertainty. The objective is to find a minimal length synchronization word with a relatively simple receiver that offers rapid time and frequency acquisition.

BACKGROUND OF THE INVENTION

It is common practice to periodically insert a fixed synchronization word in a data stream (using time-division multiplexing) so as to assist the various receivers in a system in achieving the timing and frequency necessary to successfully demodulate the received signal. It is desirable to use this fixed code word (ideally having pseudo-random properties leading to an aperiodic autocorrelation function with low sidelobes) since it can speed acquisition as compared to what can be done by directly synchronizing to the data stream which may not have a good autocorrelation function. However, use of this dedicated synchronization word does use a portion of time and communication resources that would otherwise have been available for the data stream. Consequently, it is desirable to minimize the length and the duty factor of this periodic synchronization signal.

On the other hand, in many applications, it is important to acquire this synchronization signal quickly in the face of unknown time and large frequency uncertainty with a relatively simple receiver. A good example of this situation is in satellite-based cellular telephone service. Most such systems use low- or medium-earth orbit altitude satellites to reduce the transmit power required from the mobile units. The use of such orbits results in substantial frequency uncertainty on the order of several to many tens of kHz. Often, due to the weak link budgets, the data rates for these systems is very low (on the order of 4.8 kb/s) and the signals are heavily coded. As a result the received carrier-power-to-noise-power-spectral-density ratio, or C/No, is very low. Thus, it is necessary to correlate the received signal over a substantial length of time to achieve a sufficiently high energy-per-synchronization-word-to-noise-power-spectral-density-ratio to permit reliable acquisition of the synchronization word. If a single matched-filter detector is used for acquisition it will be necessary to have a very accurate frequency estimate for good performance. The accuracy of the frequency estimate is inversely proportional to the length of the synchronization word. With a single matched filter MF, this means that it would be necessary to try many different frequency bins. In many applications this approach results in unacceptably long acquisition process. FIG. 1 illustrates a block diagram of this sequential approach where a voltage-controlled oscillator (VCO) is used to select the frequency bin.

An alternative to a single matched filter is the use of multiple matched filters MF1, MF2 . . . MFN—each one tuned to one of the many frequency bins. FIG. 2 is a block diagram of the parallel approach. Unfortunately, each matched filter is reasonably complex and the requirement for multiple units, e.g., 20 more, results in excessive equipment and power consumption. For the mobile phone example, power consumption is of great concern since the mobile phones are battery operated.

Thus, significant problems exist with the conventional sequential and parallel approaches to the acquisition of the synchronization word. The invention presented herein solves these problems resulting in the minimum length synchronization word yielding the desired reliability of acquisition with a receiver of acceptable complexity and power consumption.

To this point, for tutorial purposes, the background material has selected the example of time division multiplexing for the insertion of the synchronization word in a data stream. There are other applications, e.g., ranging systems, in which there is no data to be transmitted, and, also, there are alternative methods (to time division multiplexing) for combining the data and the synchronization signal. Those skilled in the art will easily recognize that the innovative concepts for rapid acquisition presented herein are directly applicable to such problems.

SUMMARY OF THE INVENTION

The fundamental concept is the use of a 2-level Kronecker product (Bellman, Richard, *Introduction to Matrix Analysis*, McGraw-Hill, 1960, New York) code with a dual-mode matched filter. A Kronecker product code consists of a binary high rate code which is periodically repeated (for the length of the low rate code) with or without sign inversion as defined by the low rate code. Thus, the length of the Kronecker product code is the product of the lengths of the two codes. This product code has a lot of structure in the sense that the high rate code is repeated but with possible sign inversion. In order to achieve the best overall aperiodic autocorrelation properties of the product code it is desirable that both the low- and high-rate codes have good aperiodic autocorrelation properties. As a representative example, one could use Neuman-Hofman codes(Neuman, F., and Hofman, L., "New Pulse Sequences with Desirable Correlation Properties," *Proc. National Telemetry Conference*, 1971, pp. 272–282) of length 20 and 24 to produce a code of length 480. FIG. 3 illustrates the Kronecker product code for this example. There are many other possibilities some of which might produce a better aperiodic autocorrelation function. Neuman-Hofman (NH) codes have been selected as the example since it is known they are the best possible codes of a given length in that they minimize the size of the peak sidelobe of the autocorrelation function. Because of this fact a NH code is the best choice for the high rate code and a very reasonable candidate for the low rate code.

An objective of the invention is to reduce the number of required trial frequencies by exploiting the Kronecker product nature of the synchronization signal.

The invention features a communication system for communicating between a plurality of stations wherein, at the RF transmitters, a synchronization word signal is periodically inserted in a data stream to assist the stations in achieving timing and frequency accuracy to successfully demodulate a received data stream, and to minimize the length and duty factor of the synchronization (sync) word and the time required to acquire synchronization. The synchronization word signal is generated from a Kronecker product code and the RF receivers have detectors detecting Kronecker product code synchronization word and achieving synchronization. In a preferred embodiment the Kronecker product code is a two-level Kronecker product code, and the detector includes a dual stage matched filter, particularly a dual mode sequential matched filter. In a further preferred embodiment, a sequential matched filter means is arranged to operate in post detection integration mode and reduce frequency sensitivity of the detection process. Further, the detector means includes a sequential matched filter means arranged to operate in post detection integration mode and thereby gain high rate code chip synchronization. In a further aspect of the invention the Kronecker product code is a two-level Kronecker product code and wherein one of said levels is a high rate Neuman-Hofman code.

In a further feature of the invention, the Kronecker product code is a two-level Kronecker product code and wherein one of the levels is a low rate Neuman-Hofman code.

Yet a further feature of the invention, the Kronecker product code is a two-level Kronecker product code, wherein one of the code levels is a high rate Neuman-Hofman code and one of the code levels is a low rate Neuman-Hofman code.

In still a further feature of the invention, the detector means includes a dual stage matched filter means and decimator means coupling the stages.

DESCRIPTION OF THE DRAWINGS

The above and other objects, advantages and features of the invention will become more apparent when taken with the following specification and accompanying drawings, wherein:

FIG. 10a is an overall system diagram for point-to-point links, and FIG. 10b is an overall system diagram for points-to-multipoint links or a star system.

DETAILED DESCRIPTION

Figure 1:
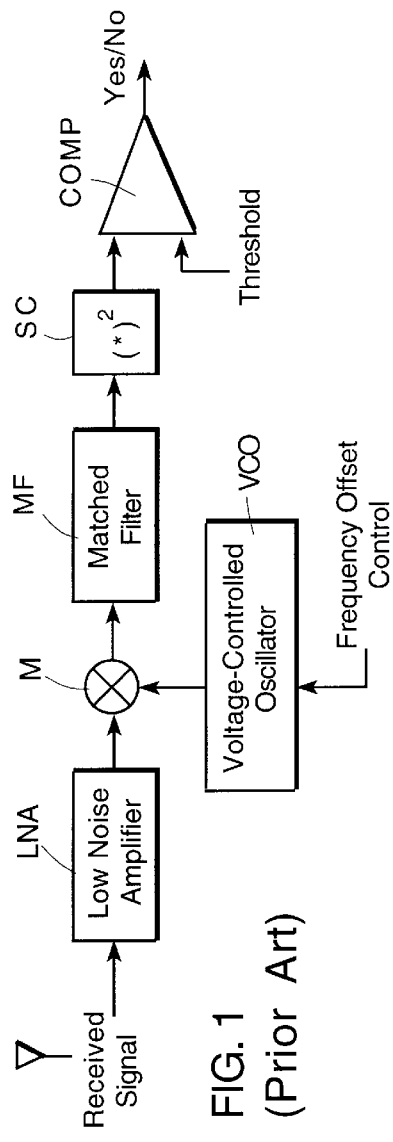
FIG. 1 (prior art) is a block diagram of a conventional receiver and synchronization word detector, FIG. 2 (prior art) is a block diagram of the parallel approach to matched filter detector.
Figure 2:
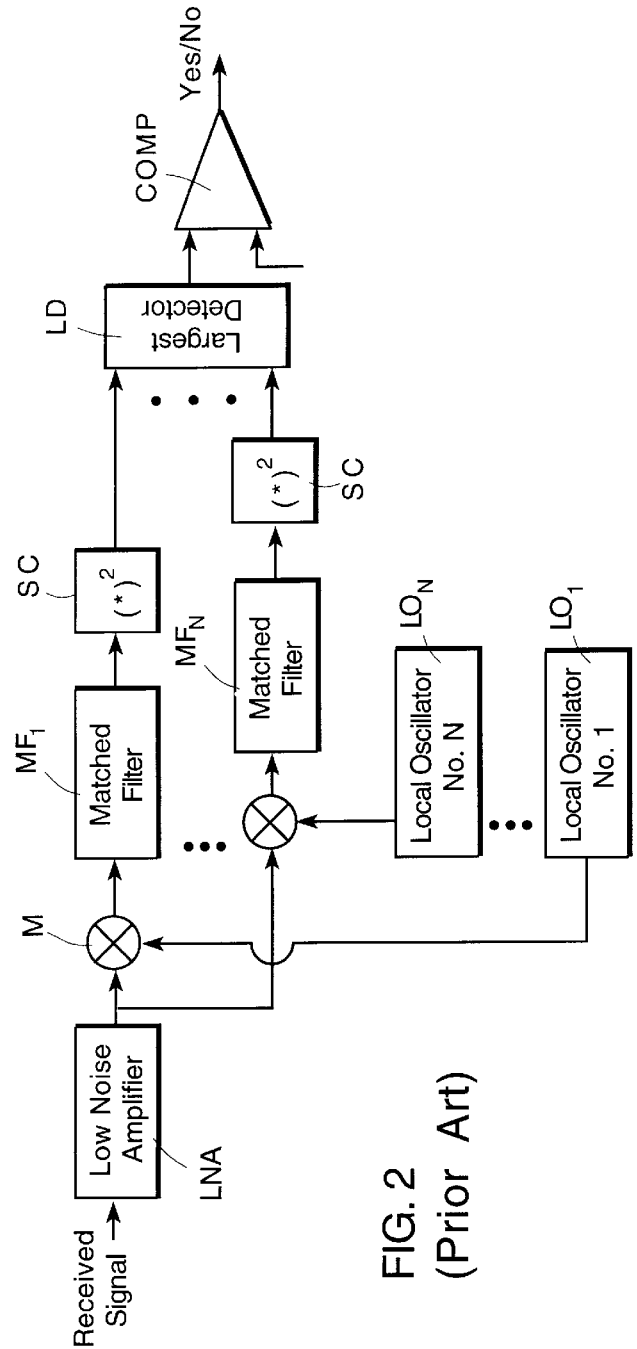
Figure 3:
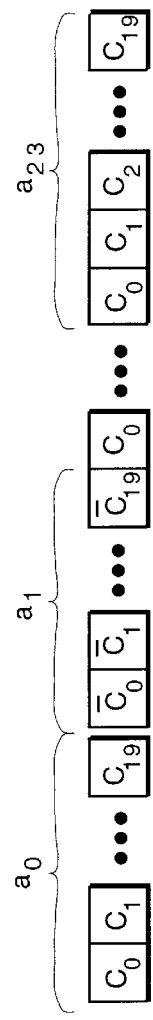
FIG. 3 is a diagrammatic illustration of a Kronecker product code created from a 20 chip NH high rate code and a 24 chip NH low rate code and incorporated in the invention.
Figure 4:
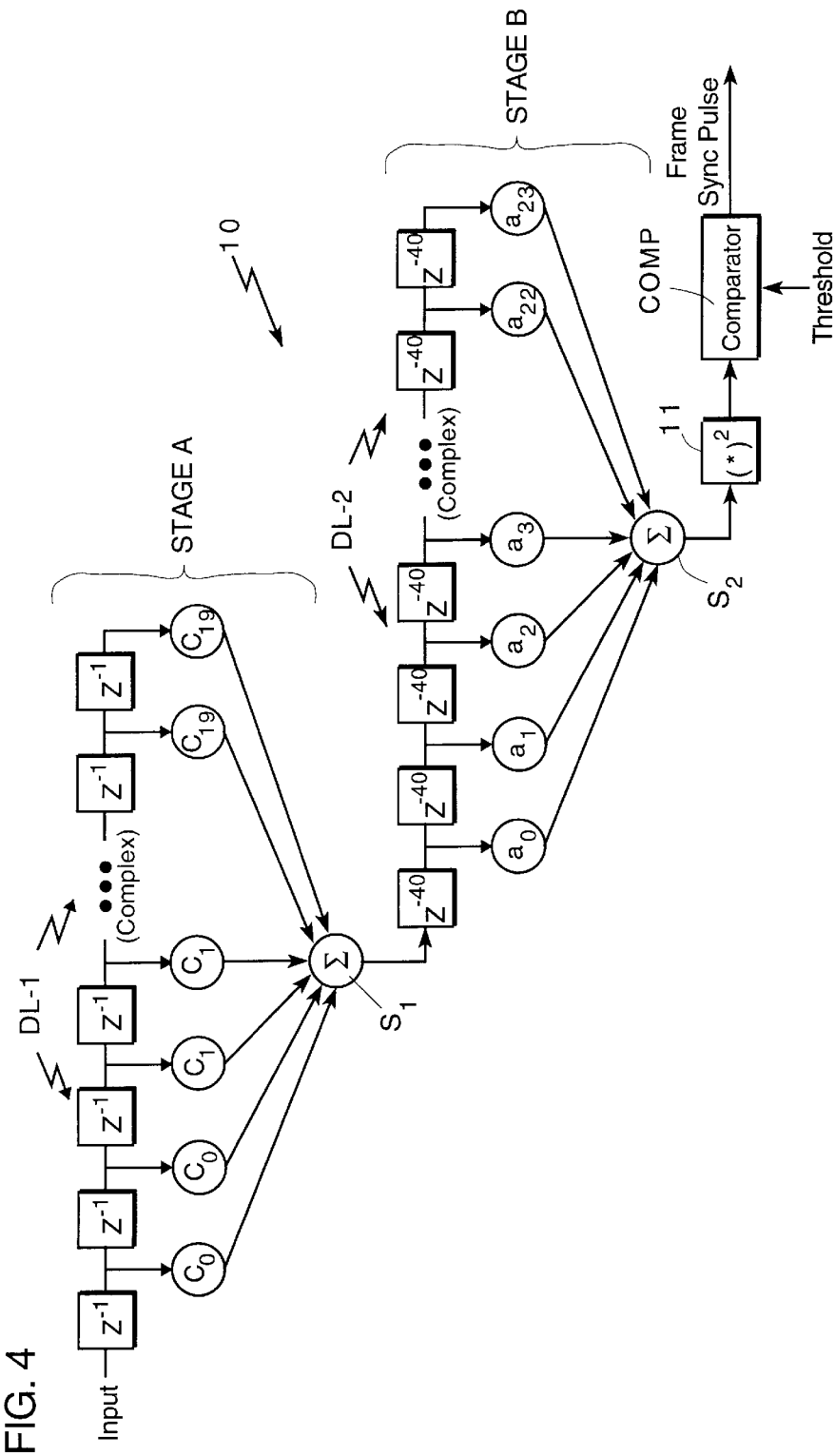
FIG. 4 is a block diagram of optimal matched-filter detector for the synchronization word incorporating the invention.

Referring now to FIG. 4, there is shown a dual-stage, stage 1 and stage 2 coherent matched filter 10 (for the example used above) where the product nature of the code has been utilized to reduce the number of required taps. The first stage, stage A, of the matched filtering is accomplished by a tapped delay line DL-1 whose coefficients are matched to the high rate code. In this example it is assumed that there are two samples per chip. Thus, each high rate chip is represented by two taps (C0, C0, C1, C1 . . . C19, C19), and the delay associated with each tap is one-half of a high rate chip duration. The second stage, stage B, of matched filtering operates on the output from summer S1 of the first stage of matched filtering. For this stage the tap spacing is one low rate chip in duration and there is only one tap per chip (A0, A1, A2, A3 . . . A23). The sampling rate is not reduced in this second stage and it is necessary to have as many shift register stages as twice the length of the product code. However, the number of taps is greatly reduced with respect to the number that would exist if one were to directly matched filter to the product code in a single stage. Note that in FIG. 2, the input is complex so there are twice as many registers and taps. Moreover, with two samples per chip, it is possible with preprocessing to eliminate redundant taps.

Note that it is necessary to have selected the down converter frequency sufficiently accurately that the carrier phase does not change significantly over the 960 samples representing the Kronecker product code. In other words the required frequency accuracy is inversely proportional to the length of the matched filter. If there is a large frequency uncertainty, then it will be necessary to try many different frequencies either sequentially or in parallel. The objective of the invention is to reduce the number of required trial frequencies by exploiting the Kronecker product nature of the synchronization signal.

According to the invention, in a preferred embodiment a dual-mode sequential matched filter based on the concept of the dual-stage matched filter is used. The word "sequential" is used since the matched filter is first operated in one mode and then after acquisition (in this mode) it sequences to the second mode for final acquisition. In the first mode the high rate code is acquired non-coherently but there are many ambiguities due to the repetitive use of this code (or its complement). In the second mode these ambiguities are resolved through the coherent use of the low rate code.

The output from summer S2 is passed through detector 11, threshold comparator 12 and outputted as the frame sync pulse for the system.

Figure 5:
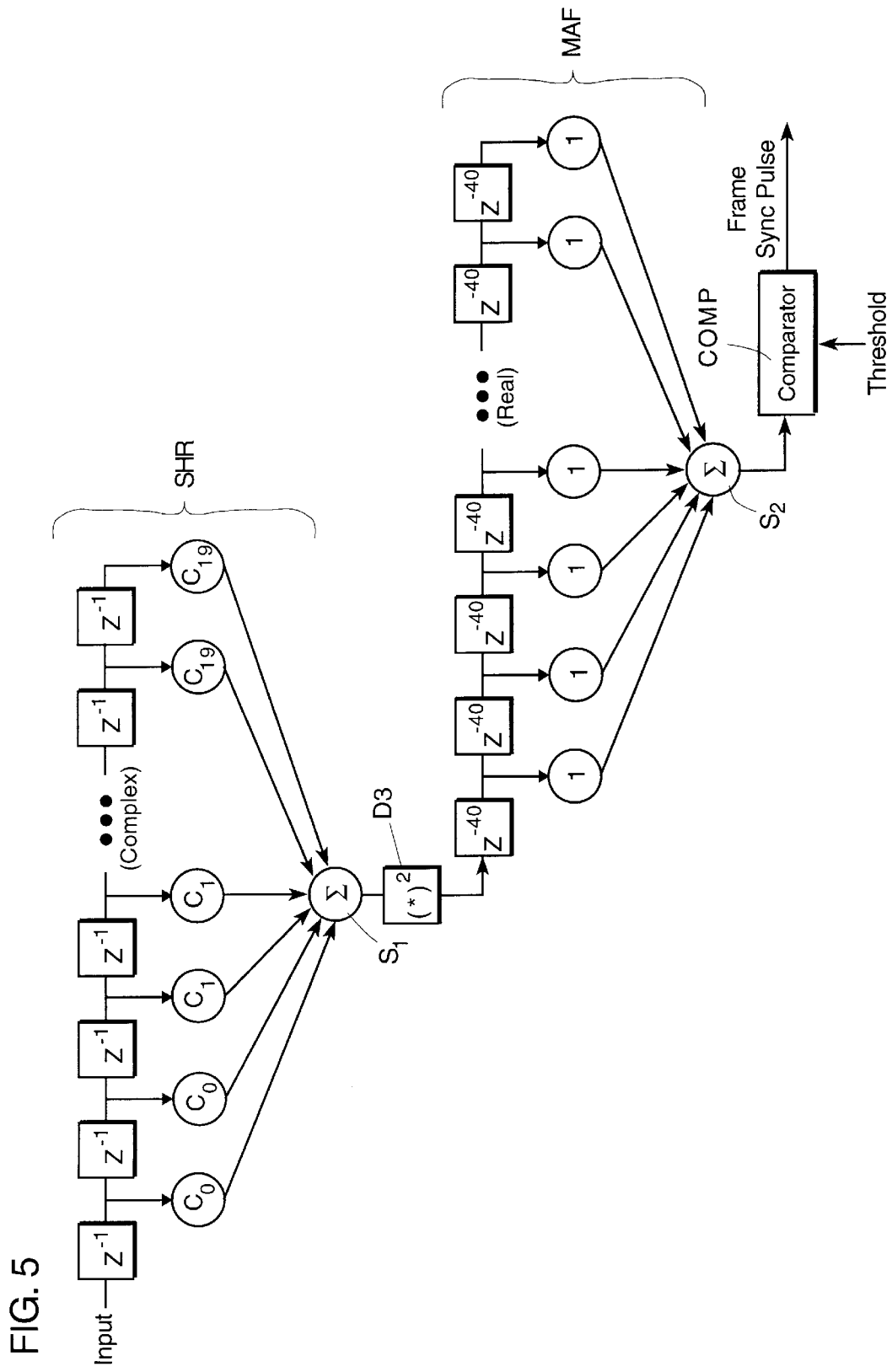
FIG. 5 is a block diagram of sequential matched-filter detector for sync word (operating in post-detection integration (PDI) mode)

The matched filter is comprised of two major parts which are operated in two different modes. In the first mode of operation which we call the post-detection integration mode the block diagram is given by FIG. 5. In this mode, which is the first stage of operation, the output of the high rate matched filter, stage SHR, is envelope detected, detector 13, and passed along to a moving average filter MAF which is the same length as the low rate code. This moving average filter performs the post-detection integration (PDI) function and increases the output signal-to-noise ratio (SNR) to the point where reliable detection occurs when the received signal is properly aligned in time and frequency in the two stage matched filter. For the representative example cited above in which the high rate code is of length 20 the sensitivity to frequency error is reduced by a factor of 24. Thus, in many cases it will not be necessary to sequentially try different bins and in other cases the number of bins will be greatly reduced. In regard to FIG. 5, note that the input is complex so there are twice as many registers and taps. Moreover, with two samples per chip, it is possible with preprocessing to eliminate redundant taps.

Assuming more than one frequency bins are tried the bin with the maximum output is selected for processing in the second mode of operation. Since the high rate code or its complement is repeated as many times as the length of the low rate code there are multiple ambiguities in the detection of the synchronization word. These ambiguities are spaced by the length of the high rate code. It is the function of the second mode of operation to resolve these ambiguities.

Figure 6:
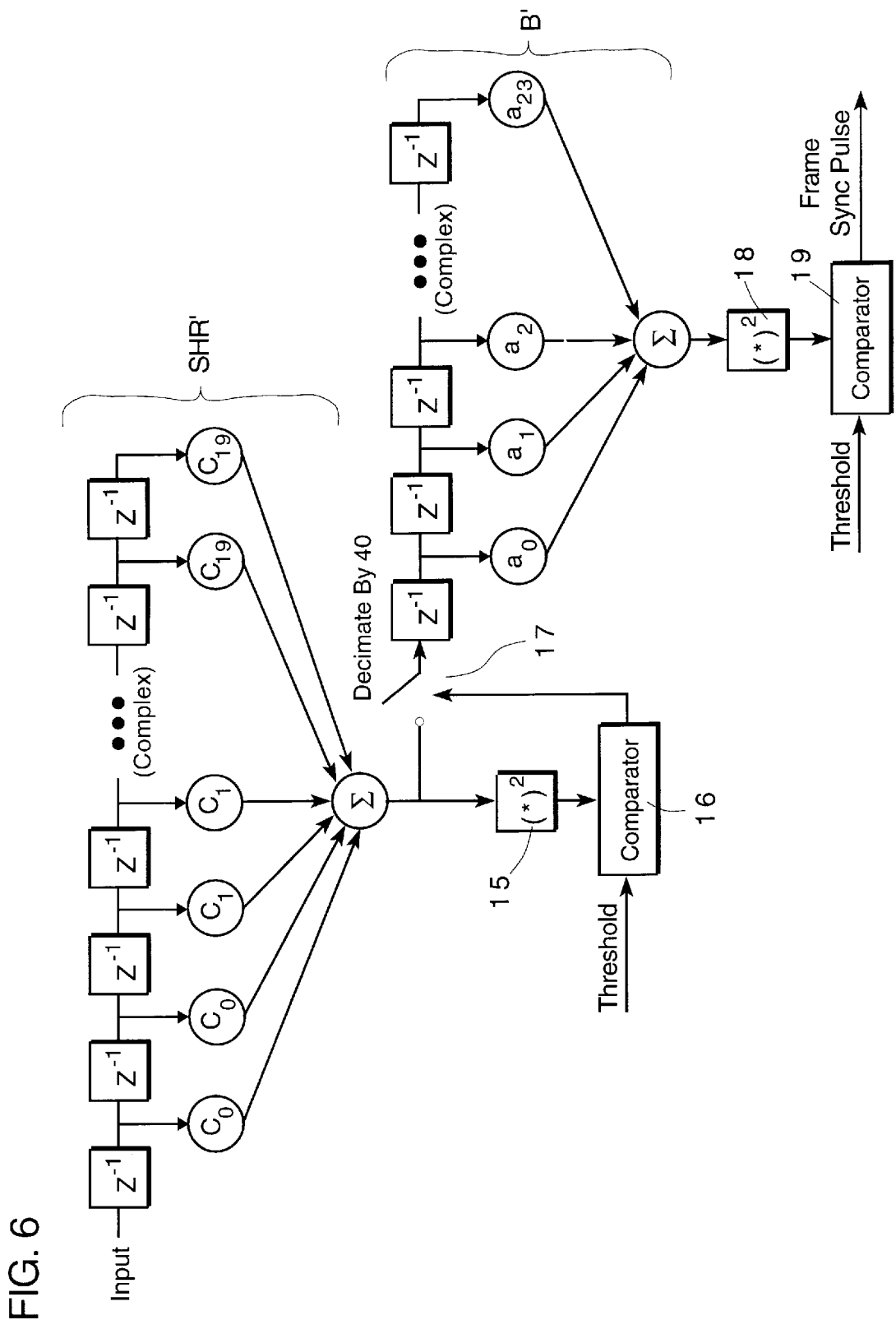
FIG. 6 is a block diagram of a sequential matched-filter detector for synchronization word (operating in fully coherent mode)

In the second mode of operation, full coherent matched filter operation is performed. by sequentially trying different frequency bins. These bins are now much more closely spaced since the coherent integration interval is much longer, e.g., 24 times longer for the example cited above. FIG. 6 is a block diagram of the sequential matched filter operating in the fully coherent mode. The output of summer $S1^1$ is detected in detector 15, compared with a predetermined threshold in comparator 16 and used to control decimator 17 which outputs the decimated signal to filter stage $B^1$ whose output is detected 18, and compared with a predetermined threshold in comparator 19 which outputs the frame sync pulse as shown. Note that in this mode of operation it is possible to reduce the sampling rate, by a factor of 40 in the selected example, of the low rate code matched filter. Operation in the earlier PDI mode has derived short code word synchronization, which is equivalent to low rate code chip synchronization since there is one high rate code period per low rate code chip. Thus, low rate code matched filter has only as many taps as there are in its length measured in chips.

Acquisition is declared when the power output of the coherent stage of matched filtering exceeds the selected threshold value.

Figure 7:
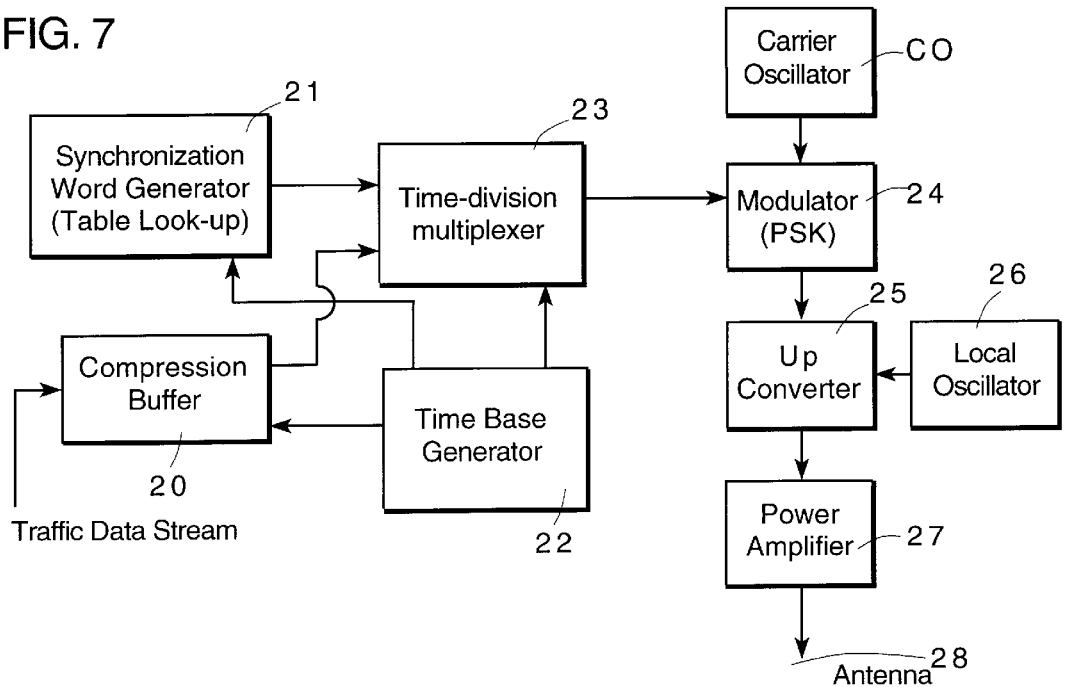
FIG. 7 is a block diagram of a representational transmitter illustrating time division multiplexing (TDM) of the synchronization (sync) word signal.
Figure 8:
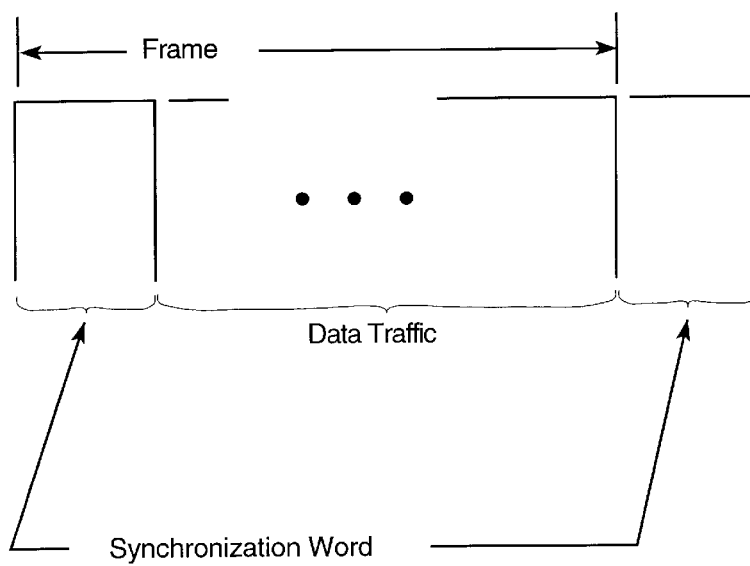
FIG. 8 shows a time division frame structure illustrating the placement of the sync word.

Referring now to FIGS. 7 and 8, the invention is shown in context of a time division multiplexed communication system in which a traffic data stream from a data source is compression buffered in buffer 20 and the Kronecker product based synchronization word is generated in synchronization word generator 21. The data traffic and sync word signals are timed by time base generator 22 and multiplexed into frames (FIG. 8) by time division multiplexer 22. The frames of sync words and data traffic are imposed or carried by modulator 24 and upconverted by upconverter 25 and oscillator 26, power amplified 27 and broadcast by antenna 28. In the embodiment of FIG. 7, the synchronization word is BPSK modulated while data traffic can use any form of PSK modulation, e.g., BPSK, QPSK, 8 PSK, or 16 PSK.

Figure 9:
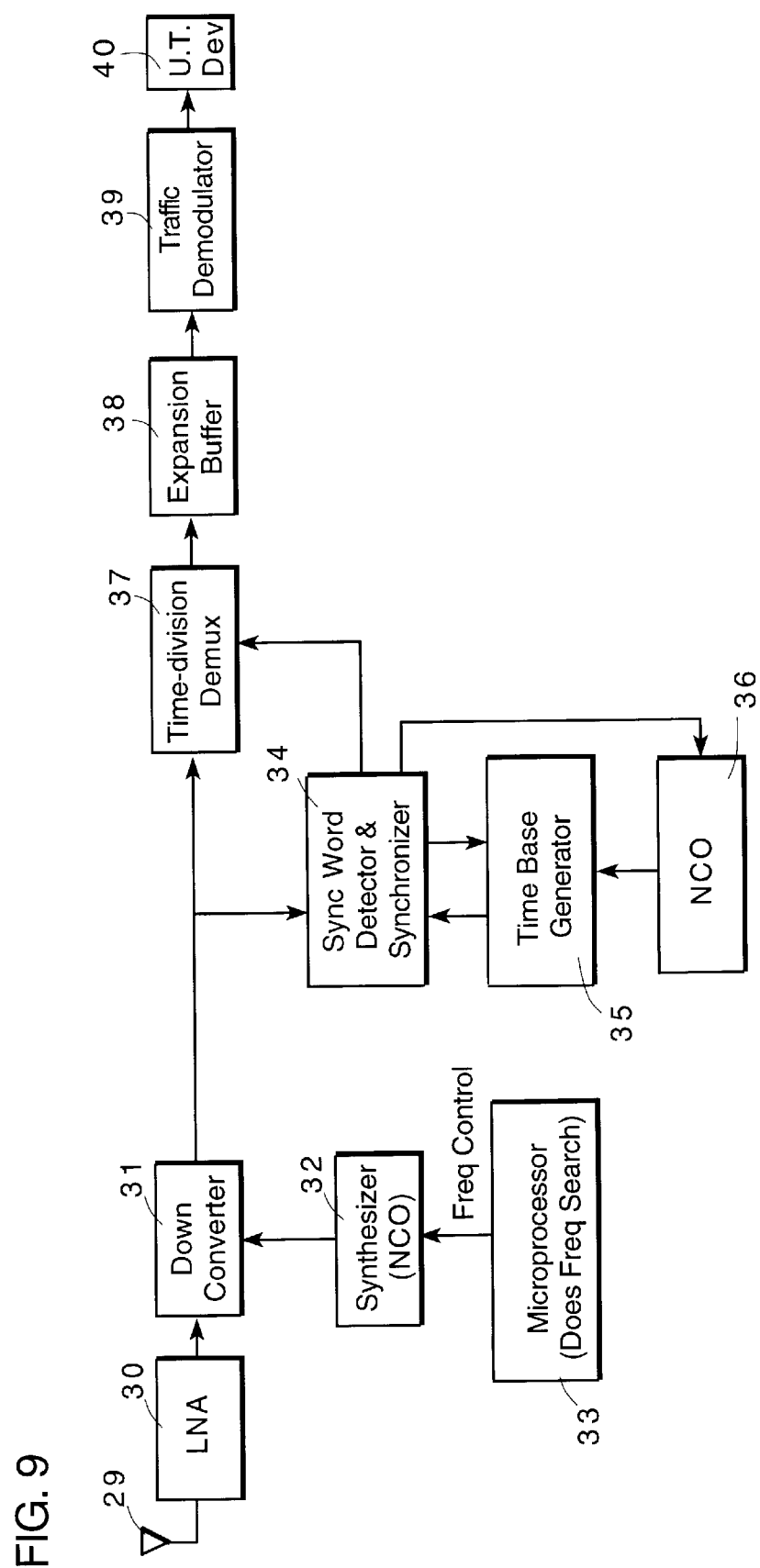
FIG. 9 is a block diagram of a representative receiver.

Referring to FIG. 9, RF broadcast signals are received by antenna 29, amplified in low noise amplifier 30 and downconverted by downconverter 31. As shown, downconverter 31 receives as one input the amplified signal from amplifier 30 and a signal from number controlled oscillator or synthesizer 32, which, in turn, receives a frequency control signal from microprocessor 33 which performs the frequency search. These components are essentially conventional. The synchronization described earlier herein is carried out in the sync word detector and synchronizer 34. The detectors shown in FIGS. 5 and 6 function in sync word detector 34. The time base is generated by time base generator 35 which is driven by number controlled oscillator 36 which is controlled by the sync word generator, detector, and synchronizer 34. Having achieved synchronization the signals are demultiplexed 37, buffered in expansion buffer 38, demodulated in traffic demodulator 39, and the traffic outputted to a utilization device 40. It is obvious that the invention can be for synchronization in a wide variety of systems such as point-to-point links (FIG. 10a) and point-to-multipoint links (FIG. 10b).

The invention features the following:
1. Use of a dual stage matched filter with Kronecker product codes to reduce the number of taps in the matched filter.
2. Use of Kronecker product codes with dual-mode sequential matched filter to acquire synchronization signal.
3. Use of PDI mode with Kronecker product codes to reduce frequency sensitivity of the detection process
4. Use of the PDI mode to gain low rate code chip synchronization
5. Use of low rate code chip synchronization to reduce the complexity of the low rate code matched filter through the process of decimation.
6. Use of a Neuman-Hofman code as the high rate code in a dual level Kronecker product code.
7. Use of a Neuman-Hofman code as the low rate code in a dual level Kronecker product code.
8. Use of Neuman-Hofman code for both the high and low rate codes in a dual level Kronecker product code.

While preferred embodiments of the invention have been illustrated and described, it will be apparent to those skilled in the art that other embodiments, modifications and adaptations of the invention are possible.

What is claimed is:

1. In an RF communication system for communicating between a plurality of stations wherein a synchronization (sync) word signal is periodically transmitted to assist said stations in achieving timing and frequency accuracy to successfully demodulate a received data stream, the time required to acquire synchronization, comprising, means for generating said synchronization word signal from a multi-level Kronecker product code including a two-level Kronecker product code and wherein each said station includes means for detecting including a dual mode sequential matched filter.

2. In an RF communication system as defined in claim 1 wherein said sequential matched filter means is arranged to operate in post detection integration mode and reduce frequency sensitivity of the detection process.

3. In an RF communication system as defined in claim 1 wherein said sequential matched filter means is arranged to operate in post detection integration mode and thereby gain low rate code chip synchronization.

4. In an RF communication system as defined in claim 1 wherein one of said levels is a high rate Neuman-Hofman code and the other one of said levels is a low level Neuman-Hofman code.

5. In an RF communication system as defined in claim 4 wherein said Kronecker product code is a two-level Kronecker product code and wherein one of said levels is a low rate Neuman-Hofman code.

6. In an RF communication system as defined in claim 1 wherein said means for detecting includes a dual stage matched filter means and decimator means coupling said stages.

7. In an communication system having a plurality of stations each having RF transmitters and RF receivers communicating in time division multiplex (TDM) mode and wherein at said RF transmitters a synchronization (sync) word signal is periodically inserted in a data stream to assist said stations in achieving timing and frequency accuracy to successfully demodulate a received data stream, the improvement for minimizing the length and duty factor of said sync word and the time required to acquire synchronization, comprising, means at said transmitters for generating said sync word signal from a multi-level Kronecker product code and means at said RF receivers for detecting said sync word and achieving synchronization, said Kronecker product code being a two-level Kronecker product code and wherein said means for detecting includes a dual stage matched filter.

8. In an RF communication system as defined in claim 7 wherein said means to detect comprising dual mode sequential matched filter means.

9. In an RF communication system as defined in claim 7 wherein said detector means includes a sequential matched filter means arranged to operate in post detection integration mode and reduce frequency sensitivity of the detection process.

10. In an RF communication system as defined in claim 7 wherein said detector means comprising a sequential matched filter means arranged to operate in post detection integration mode and thereby gain low rate code chip synchronization.

11. In an RF communication system as defined in claim 7 wherein said Kronecker product code is a two-level Kronecker product code and wherein one of said levels is a high rate Neuman-Hofman code.

12. In an RF communication system as defined in claim 7 wherein said Kronecker product code is a two-level Kronecker product code and wherein one of said levels is a low rate Neuman-Hofman code.

13. In an RF communication system as defined in claim 7 wherein said means for detecting includes decimator means coupling said stages.

14. In an RF communication system between a plurality of stations, each station including an RF transmitter having means for periodically transmitting a multilevel synchronization word in a data stream, the improvement wherein said synchronization code word is a Kronecker product code having a high rate code and a low rate code, and each station includes a receiver having a dual-stage sequential matched filter having a decimator between stages and arranged such that in a first stage of operation the output of said filter matched to said high rate code is non-coherently integrated in a post-detection integrator to obtain reliable acquisition of the synchronization word, and in a second stage of operation the ambiguity is resolved.

* * * * *